United States Patent [19]

Haass

[11] 4,263,668

[45] Apr. 21, 1981

[54] METHOD AND CIRCUIT ARRANGEMENT FOR FULL DUPLEX TWO-WIRE TRANSMISSION OF A TERNARY DATA SIGNAL

[75] Inventor: Adolf Haass, Munich, Fed. Rep. of Germany

[73] Assignee: Siemens Aktiengesellschaft, Berlin & Munich, Fed. Rep. of Germany

[21] Appl. No.: 61,064

[22] Filed: Jul. 26, 1979

[30] Foreign Application Priority Data

Sep. 8, 1978 [DE] Fed. Rep. of Germany ....... 2839231

[51] Int. Cl.³ .............................................. H04L 5/14
[52] U.S. Cl. .................................................... 370/24
[58] Field of Search ..................... 178/58 R, 58 A, 68; 325/38 R, 38 A, 38 B; 340/347 DD; 179/15 BM; 370/24, 32; 375/17, 37, 114, 116, 53

[56] References Cited

U.S. PATENT DOCUMENTS

| | | | |
|---|---|---|---|
| 4,087,642 | 5/1978 | Jessop et al. | 325/38 A |
| 4,097,859 | 6/1978 | Looschen | 325/38 A |

Primary Examiner—Thomas A. Robinson
Attorney, Agent, or Firm—Hill, Van Santen, Steadman, Chiara & Simpson

[57] ABSTRACT

Automatic digital simulation of a two-wire line is provided for the transmission of data in full duplex operation. Coefficients which signal the influence of ternary values on a received signal are stored in a plurality of sub-intervals of the individual ternary values and information are stored which signal the ternary values assigned to the coefficients. After a comparison of the received signal with the simulated signal, the coefficients are continuously corrected and the simulated signal is obtained by summing the coefficients.

7 Claims, 6 Drawing Figures

FIG 3
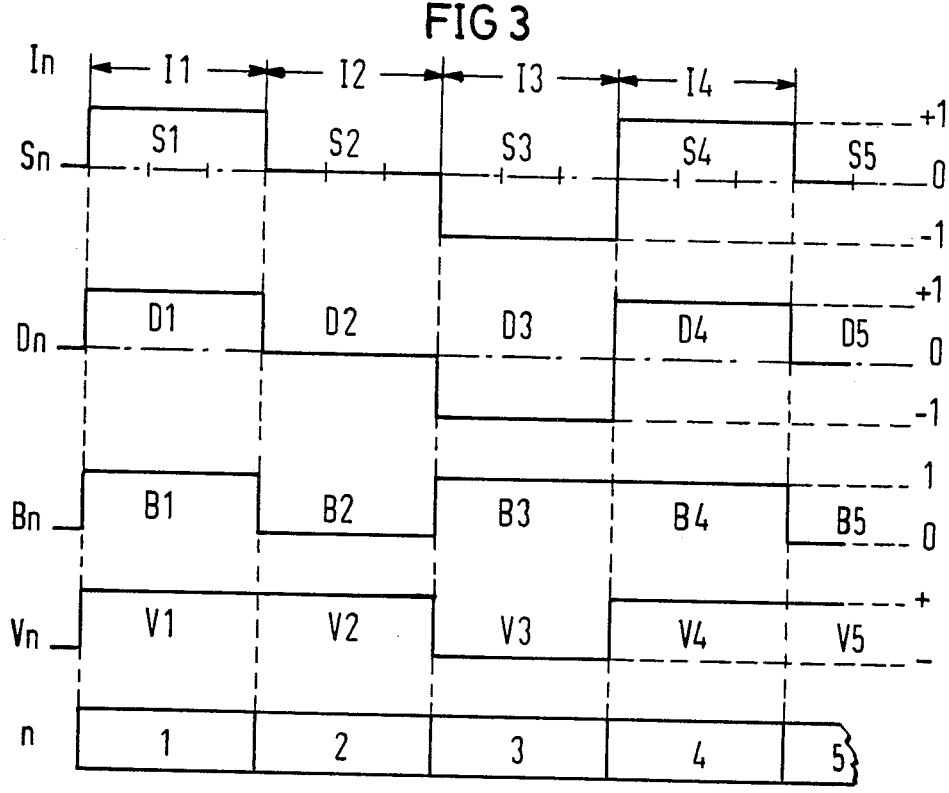
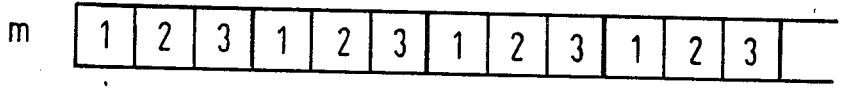
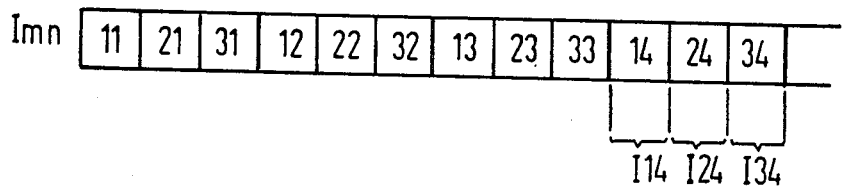
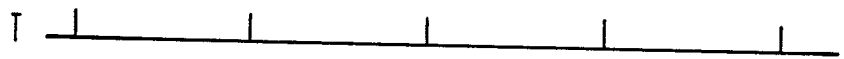

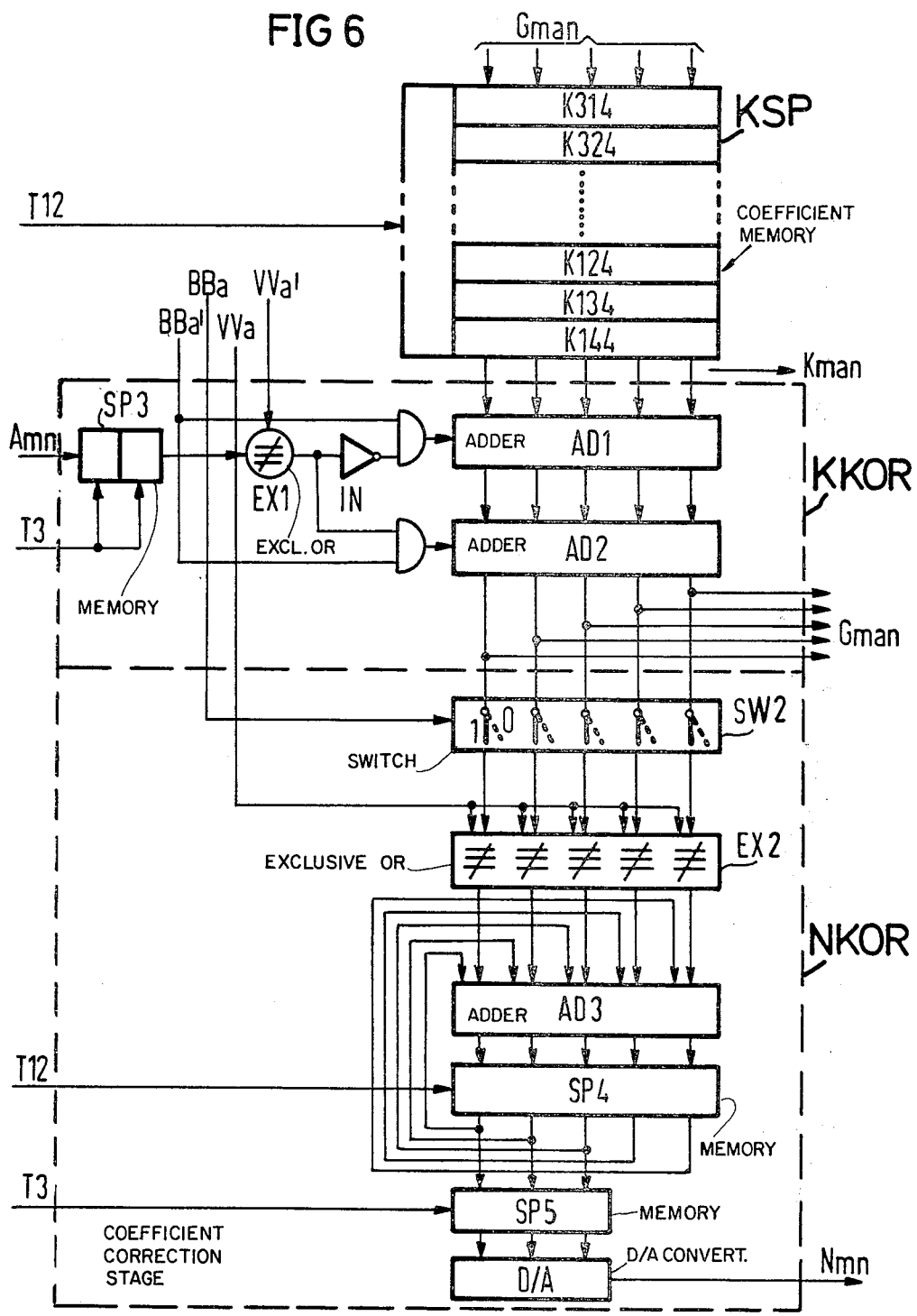

METHOD AND CIRCUIT ARRANGEMENT FOR FULL DUPLEX TWO-WIRE TRANSMISSION OF A TERNARY DATA SIGNAL

BACKGROUND OF THE INVENTION

1. Field of the Invention

The present invention relates to a method and to a circuit arrangement for full duplex two wire transmission of a ternary data signal whose ternary values are formed of positive signal parts, negative signal parts and of zero signal parts, whereby interferences of the received signal by means of its own transmission signal are prevented with the assistance of a simulated signal.

2. Description of the Prior Art

Known balancing networks for simulation purposes are formed of a plurality of time constant elements having adjustable capacitors and resistors connected in parallel. The adjustment can be undertaken manually; however, circuit arrangements are also known with whose assitance the balancing network resistors can be automatically adjusted in an analogous manner.

SUMMARY OF THE INVENTION

The object of the present invention is to provide a method, and a circuit arrangement for performing a method, with whose assistance the simulation of a two wire line can be implemented automatically and upon employment of digital circuits.

The above object is achieved, according to the present invention, through the following steps:

(a) Respectively c·d coefficients having respectively p bits are assigned to each ternary value of the ternary data signal, whereby the number c signifies a predetermined plurality of sub-intervals of the ternary value duration, the number d signifies a predetermined plurality of coefficients per sub-interval and the number p signifies a predetermined plurality of bits;

(b) Information concerning the transmitted ternary values are stored and, at each sub-interval, storage signals are emitted which signal the last d ternary values and are assigned to respectively d coefficients;

(c) The simulated signal is obtained by means of a summation or, respectively, subtraction of all coefficients of a sub-interval which relate to positive signal portions of the storage signals and by means of subtraction or, respectively, summation of all coefficients of this sub-interval which relate to negative signal portions;

(d) The values of the received signal occurring during the sub-intervals are compared with the simultaneously occurring values of the simulated signal and it is signaled with a first or second binary comparison value whether the concern value of the received signal is smaller or greater than the value of the simulated signal; and (e) The coefficients are continuously corrected and assigned anew to the ternary values of the ternary data signal; in the case the ternary values of the storage signals indicate zero signal portions, the assigned coefficients are not changed; in case the ternary values of the storage signals indicate negative signal portions and the first binary comparison value occurs or in case the ternary values of the storage signal indicate positive signal portions and the second binary comparison value occurs, then an increase or, respectively, decrease of the coefficients is undertaken by a predetermined number; in case the ternary values of the storage signals indicate negative signal portions and the second binary comparison value occurs or in case the ternary values of the storage signals indicate positive signal portions and the first binary comparison value occurs, then a decrease or, respectively, an increase of the coefficients is effected by a predetermined number.

Because of the digital manner of operation, the invention can be realized with an integrated circuit module; therefore, it can be realized with relatively low costs and the integrated circuit module has only small space requirements. In particular, the invention can be realized in metal-oxide-semiconductor (MOS) technology, so that only little power is required.

A further advantage of the invention is to be seen in that it can be employed even given high transmission rates of the ternary signal to be transmitted, because only c·d sub-intervals and corresponding coefficients are required during the ternary value duration. With respect to the simulated signal, any desired curve forms may be realized, because the coefficients automatically adjust themselves as desired. A further advantage of the invention is to be seen in that it is applicable to all ternary data signals. Since the invention functions with clock pulse control, other bit rates can be set in a simple manner by means of changes of the clock pulses.

In order to carry out the summation or, respectively, subtraction of the coefficients with minimum technical expense, it is advantageous that two binary signals are obtained from the ternary data signal of which the first binary signal indicates the amounts of the ternary data signal and the second binary signal indicates the operational sign of the ternary data signal.

In order to have the ternary values available at the same time as the assigned coefficients, it is advantageous that the d binary values of the first binary signal and the d binary values of the second binary signal are respectively stored c times during a ternary value duration.

In order to be able to realize the storage of the coefficients and of the ternary values with a minimum expense, it is advantageous that shift registers be provided for storing the coefficients and the ternary values.

BRIEF DESCRIPTION OF THE DRAWINGS

Other objects, features and advantages of the invention, its organization, construction and operation will be best understood from the following detailed description, taken in conjunction with the accompanying drawings on which the same elements appearing on different sheets have the same reference characters, and on which:

FIG. 3 is a signal chart relating to the data transmission for the system illustrated by a combination of FIGS. 1 and 2;

FIG. 6 is a schematic representation of a coefficient memory, a coefficient correction stage and a simulation correction stage.

DESCRIPTION OF THE PREFERRED EMBODIMENTS

Figure 1:
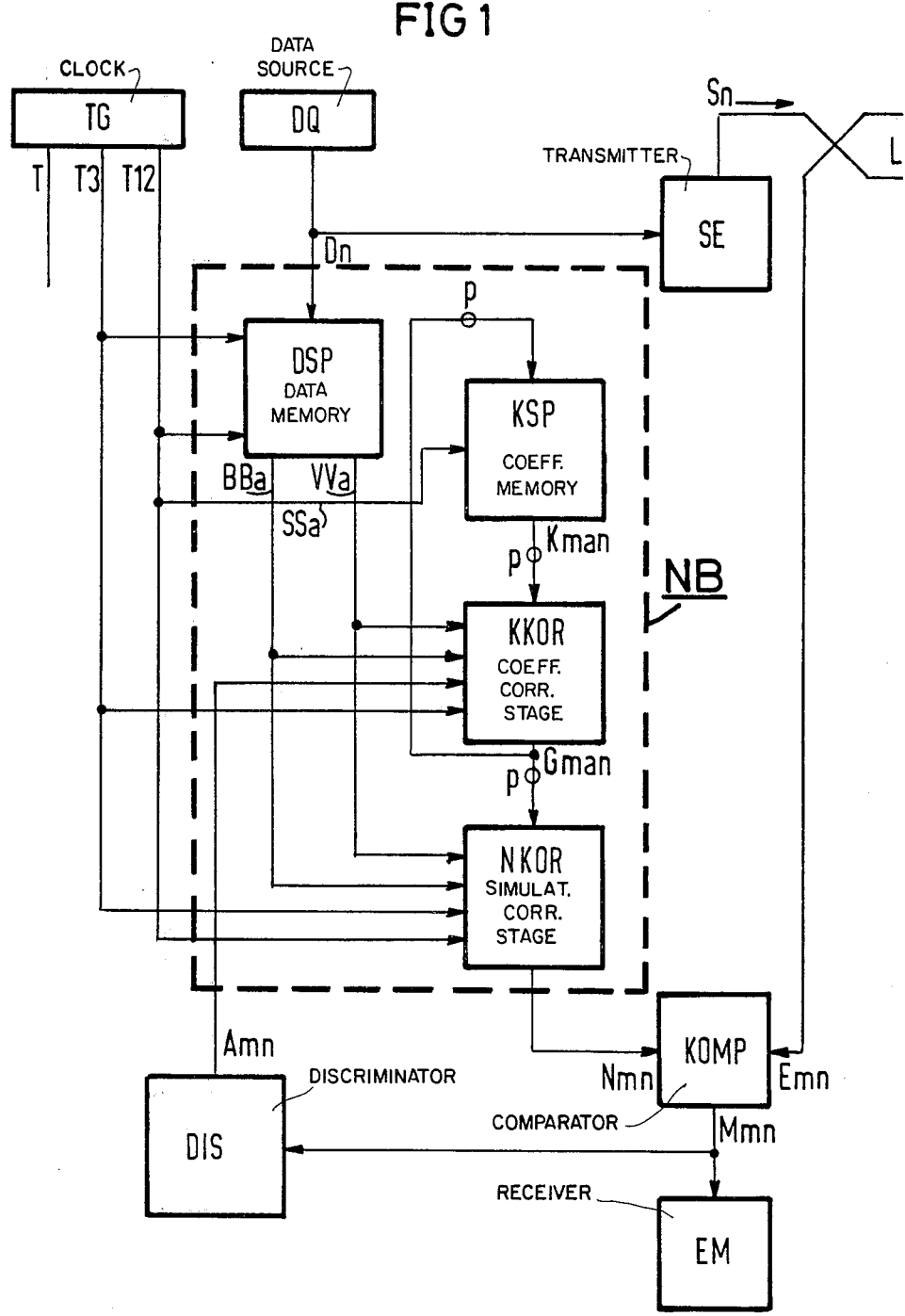
FIG. 1 is a schematic diagram of a first station for full duplex two wire transmission of data.
Figure 2:
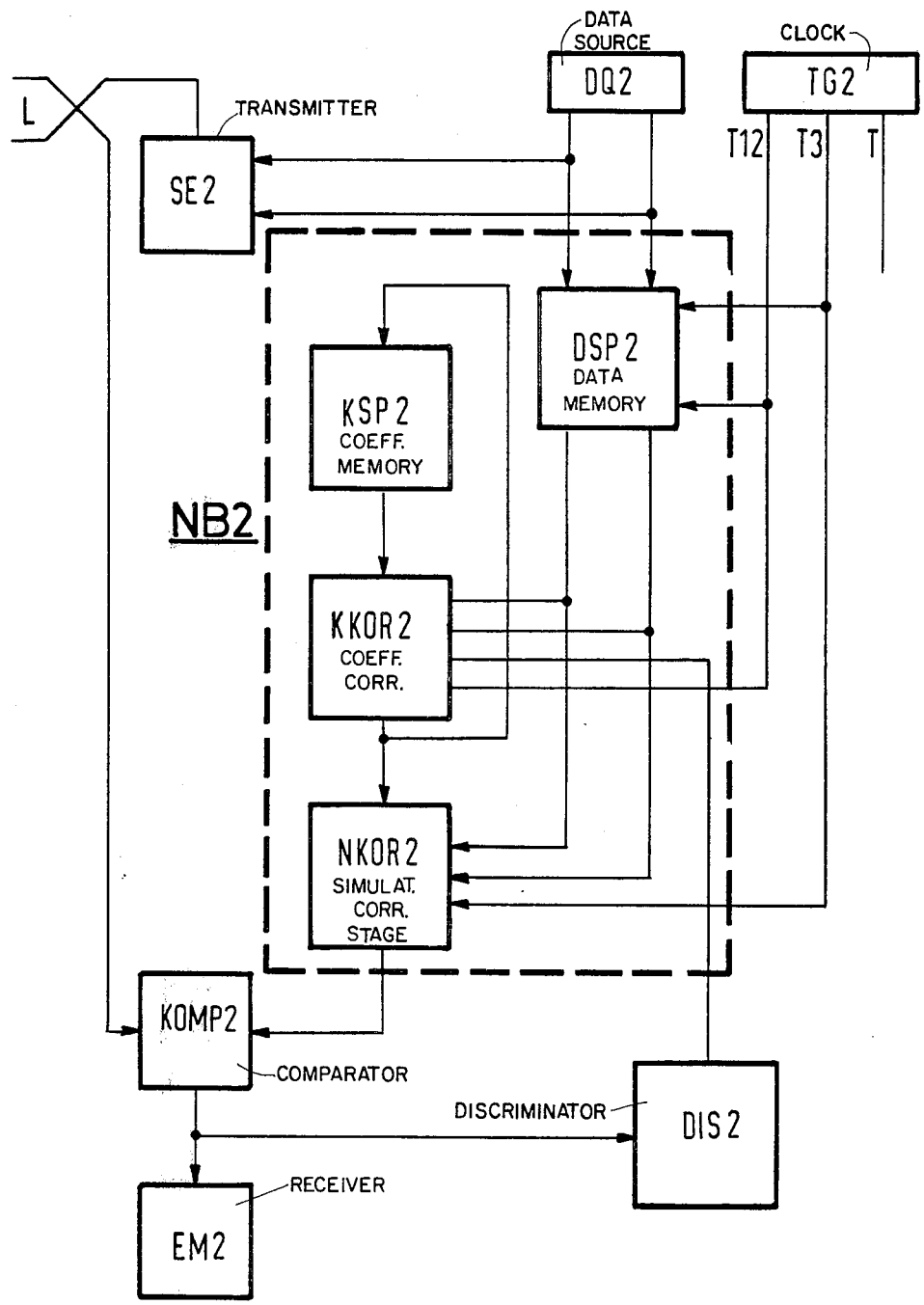
FIG. 2 is a schematic representation of a second station for full duplex two wire transmission of data.
Figure 4:
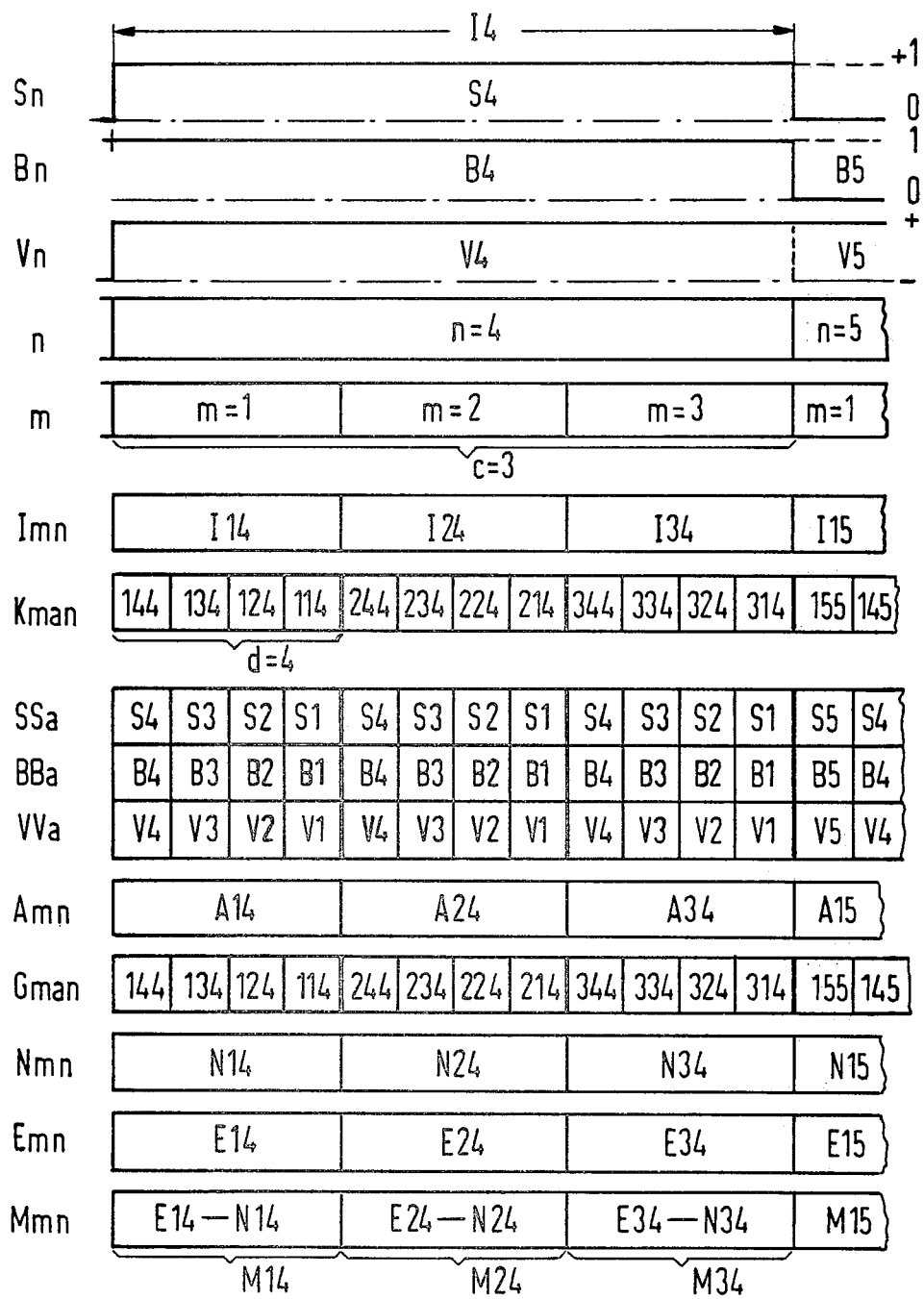
FIG. 4 is a signal chart for explaining the yield of the simulated signal.

FIG. 1 schematically illustrates a first station for full duplex transmission of data to a second station, that is to the station of FIG. 2, for example. FIGS. 3 and 4 illustrates some of the signals occurring at the two stations of FIGS. 1 and 2. In the following, the first station of FIG. 1 is described in greater detail; however, the similarly constructed second station of FIG. 2 is not discussed in detail for the purpose of simplicity and clarity. The reference characters of the elements illustrated in FIG. 2 are distinguished from the corresponding reference characters of FIG. 1 by the provision of the appended "2".

A clock TG in FIG. 1 generates clock pulses T, T3, T12 which are illustrated at the bottom of FIG. 3. A data source DQ emits the ternary signal Dn to a transmitter SE on the one hand, and, on the other hand, to a data memory DSP. The individual ternary values of the ternary data signal are referenced D1, D2, D3, D4, D5. The reference character n serves as an indication and assumes the values 1 through 5 in the present example. The signal Sn transmitted by the transmitter SE is largely identical to the signal Dn. As a function of the signal Dn, the transmitted signal Sn is generated with the assistance of the transmitter SE, and is supplied in further sequence to the second station illustrated in FIG. 2 by way of line L. The transmitted signal Sn is composed of positive signal portions +1 of the ternary values S1, S4; of negative signal portions −1, for example, of the ternary value S3, and of 0 signal portions, for example, of the ternary value S2.

There are a number of possibilities with respect to the signals emitted by the data source DQ, whereas it is assumed in all cases that a ternary signal Sn is transmitted from the first station to the second station. In case the data source DQ emits a ternary signal, then this can occur by way of a single line as is illustrated in FIG. 1. The ternary signal emitted by the data source DQ, however, can also be represented by means of two binary signals which are emitted by way of two lines. For example, it is conceivable that the data source DQ emits the binary signals Bn and Vn illustrated in FIG. 3, which together represent the ternary signal Dn. Thereby, the signal Bn indicates the amount and the signal Vn indicates the operational sign of the ternary values of the ternary signal Dn. For example, the positive signal portion +1 of the ternary value D1 is provided with the binary values B1=1 and V1=1.

It is also conceivable that the data source DQ illustrated in FIG. 1 emits a binary signal, for example, the signal Bn illustrated in FIG. 3. The ternary signal Sn is assigned to this binary signal according to known coding processes. Where the re-coding of the binary signal into the ternary signal Sn is undertaken is actually of no significance in respect of the present invention. For example, a coder which undertakes the recoding operates digitally or on an analog bases and can be provided in the transmission path between the data source DQ and the transmitter SE. A further digital or analog coder which effects a recoding of the binary signal into a ternary signal can also be provided in the transmission path between the data source DQ and the data memory DSP. However, only a single digital or analog operating coder can be connected to the output of the data source DQ, the output signals of the coder being supplied to the transmitter SE and to the data memory DSP. At this junction, it must be emphasized that it is in no way true that the same ternary values S1, S2, S3, S4 of the signal Sn must be stored in the data memory DSP. Quite to the contrary, it is sufficient to store information in the data memory DSP which indicate the sequence of the ternary values of the signal Sn. In the exemplary embodiment described on the bases of FIGS. 1–4, this occurs with the assistance of the signals Bn and Vn.

The interval In of the individual ternary values is indicated at the top of FIG. 3. Each interval In is divided into three sub-intervals which are differentiated with the index m. With the assistance of the indices m and n, therefore, on the one hand the interval of the individual ternary values is characterized and, on the other hand, the allocated sub-intervals Imn are characterized. In particular, the interval I1 and the sub-intervals I11, I21, I31 are assigned to the ternary value S1; the interval I2 and the sub-intervals I12, I22, I32 are assigned to the second ternary value S2; the interval I3 and the sub-intervals I13, I23, I33 are assigned to the ternary value S3; and the interval I4 and the sub-intervals I14, I24, I34 are assigned to the ternary value S4.

FIG. 4 illustrates the ternary value S4 during the interval I4 and the corresponding signals on an enlarged scale. The positive signal portion +1 of the ternary value S4 is again illustrated by means of the amount B4 and by means of the operational sign V4. The plurality of the sub-intervals per interval In is designated in general with the letter c. Therefore, in the present case, with c=3, a total of three intervals per interval In is provided. In the present example, a total of twelve coefficients Kman are assigned to each ternary value. Respectively, four of these coefficients refer to one of the illustrated sub-intervals. A plurality of coefficients per sub-interval is designated, in general, with the character d. Therefore, in the present case, with d=4, a total of four coefficients per sub-interval is provided. The product c·d=12 yields the plurality of the coefficients per interval In.

The data memory DSP illustrated in FIG. 1 stores the last four ternary values within the individual sub-intervals with d=4. In this connection, it is assumed that a pulse from the transmitter SE occurring at the input of a comparator KOMP lasts during the interval I1, I2, I3 and I4. Upon the generation of the simulated signal Nm4, therefore, the pulse deriving from the ternary value S1 must also be taken into consideration. During the time of the sub-interval I14, for example, information are stored in the data memory DSP, to indicate the signal portions of the last four ternary values S4, S3, S2, S1. In the present exemplary embodiment, these information are represented by the binary values B4 or, respectively, V4; B3 or, respectively, V3; B2 or, respectively, V2; and B1 or, respectively, V1. The data memory DSP emits these information with the assistance of the signals BBa and VVa. It is clear that the respectively same sequence of ternary values of the signal SSa or, respectively, the same sequence of the binary values of the signals BBa and VVa is emitted during all sub-intervals I14, I24, I34. These ternary values and binary values are identified with the index a. The index a corresponds to that index n which the ternary values Sn and the binary values Bn, Vn had upon their occurrence according to FIG. 3. The index a is required, because the ternary values of the signal SSa and the binary values of the signals BBa, VVa generally occur at different points in time then the values of the signals Sn, Bn and Vn illustrated in FIG. 3. The indices n and a are identical only upon the respectively transmitted ternary value. For example, with n=4, the ternary value S4 of the signal Sn has the same index as the ternary value S4 of the signal SSa with a=4.

In the present exemplary embodiment, the last ternary value is respectively emitted at the beginning of the sub-intervals and the first ternary value is respectively emitted toward the end of the sub-intervals. For example, the ternary values S4, S3, S2 and S1 are respectively emitted in the sub-intervals I14, I24 and I34 and the ternary values S5, S4, S3 and S2 are respectively emitted in the sub-interval I15. Thereby, the sequence of the ternary values within the sub-intervals is random. For example, the ternary values could also be emitted in the sequence S1, S2, S3 and S4 or S2, S4, S1, S3 during the sub-intervals I14, I24, I34.

The coefficient memory KSP illustrated in FIG. 1 stores the coefficients Kman illustrated in FIG. 4. The first index m characterizes the assigned sub-interval. The second index a characterizes the assignment of these coefficients to the individual ternary values which occurred earlier. In this regard, these second indices are identical to the indices of those ternary values which are represented by the signals SSa, BBa and VVa. The third index n characterizes the ternary value of the signal Sn respectively transmitted by the transmitter SE. All of the coefficients Kma4 assigned to the interval I4, therefore, have the same index n=4.

Each of the coefficients is characterized by means of the above mentioned indices. For example, the coefficient K234 refers, with m=2, to the second sub-interval, with a=3 to the preceding ternary value S3 and with n=4 to the transmitted ternary value S4. Therewith, the coefficient K234 indicates how the ternary value S3 transmitted earlier operates in the sub-interval I24. In all, all coefficients K244, K234, K224, K214 assigned to the sub-interval I24 contain information which indicate how the ternary values S4, S3, S2, S1 transmitted earlier operate in the sub-interval I24. On the basis of these information, the simulated signal Nmn is obtained, with whose help the disruptive influences of its own transmitter SE on its own receiver EM are prevented. The coefficients Kman are stored in the coefficient memory KSP in the form of binary words having respectively p bits. In a realized exemplary embodiment, with p=15, these binary words respectively consist of 15 bits.

The received signal Emn and the simulated signal Nmn are compared with one another in the comparator KOMP and the signal Mmn is obtained which represents the difference of the two signals. As is illustrated in FIG. 4, respectively one value of the signals Emn or, respectively, Nmn is assigned to the individual sub-intervals, so that a specific value Mmn occurs for each sub-interval. For example, the signal M14=E14−N14 is assigned to the sub-interval I14. This signal is supplied to a discriminator DIS which operates according to Table I:

TABLE I

| Mmn | Amn |
|---|---|
| Emn-Nmn >0 | 0 |
| Emn-Nmn <0 | 1 |

The discriminator DIS therefore generates the binary signal Amn, which assumes the values "0" and "1". As long as the signal Mmn is greater than zero, the binary value "0" of the signal Amn occurs and the binary value "1" of the signal Amn occurs as long as the signal Mmn is less than zero.

The coefficients Kman are corrected case-by-case with the assistance of a coefficient correction stage KKOR illustrated in FIG. 1 and with the assistance of the signal Amn, so that the coefficients Gman occur. The coefficients Kman and Gman have the same indices.

The coefficients Gman are likewise represented by binary words each havng p bits. Since the coefficients Gman are again input from the output of the coefficient correction stage KKOR into the coefficient memory KSP, the coefficents Kman are also continuously corrected. The transfer of the coefficients Gman into the coefficient memory KSP occurs in the clock pulse T12 illustrated in FIG. 3. During the interval of the transmitted ternary value S4, twelve coefficients are newly transferred into the coefficient memory KSP and remain stored during an interval which is equal to the duration of the individual ternary values. Thereby, the transfer and storage of these coefficients occurs in such a manner that, for example, the coefficient G144 is transferred into the coefficient memory KSP at the beginning of the sub-interval I15. The coefficient G144, therefore, is represented by means of the same binary word as the coefficient K155. The same is also true for further coefficients. For example, the coefficient G134 is identical to the coefficient K145. In a somewhat more general notation, therefore, the following relationship holds true:

Gm, a, n = Km, a+1, m+1.

In the following, the correction of the coefficients is explained on the basis of Table II.

TABLE II

| Sa of SSA | Ba of BBa | Va of VVa | Amn | Gman | Gman |
|---|---|---|---|---|---|
| 0 | 0 | 0 | 0 | Kman + 0 | Kman + 0 |
| 0 | 0 | 0 | 1 | Kman + 0 | Kman + 0 |
| 0 | 0 | 1 | 0 | Kman + 0 | Kman + 0 |
| 0 | 0 | 1 | 1 | Kman + 0 | Kman + 0 |
| −1 | 1 | 0 | 0 | Kman − 1 | Kman + 1 |
| −1 | 1 | 0 | 1 | Kman + 1 | Kman − 1 |
| +1 | 1 | 1 | 0 | Kman + 1 | Kman − 1 |
| +1 | 1 | 1 | 1 | Kman − 1 | Kman + 1 |

In the heading of Table II, the reference symbols of the signals Sa, Ba, Va Amn and the coefficients Gman are entered in sequence. The first four lines of the table refer to cases in which the storage signals SSa and BBa respectively indicate zero signal portions. In these case, the coefficient Kman is not changed and is identical with the coefficients Gman. For example, according to FIG. 3, a zero signal portion is indicated with the ternary value S2 and with the binary value B2. FIG. 4 illustrates that this zero signal portion in the interval I14 is assigned to the coefficient K124. In this case, the coefficient K124 is not changed and is identical to the coefficient G124. Since the ternary value S2 transmitted during the interval I2 represents a zero signal portion, no after-effect is to be expected in the interval I14. Moreover, given these assumptions, the coefficient K124 is not employed in the yield of the simulated signal N14. For these reasons, a correction of the coefficient K124 is not required.

The fifth and sixth lines of Table II refers to a negative signal portion −1 of the ternary value Sa. This negative signal portion −1 is also indicated by means of the binary values "1", and "0", respectively, or the binary values Ba and Va. With the binary value Amn equal to "0", it is indicated that the difference Emn-Nmn is greater than zero. Upon this precondition, the coefficient Kman is decreased by a 1 according to the fifth column of Table II. For example, it is assumed that the ternary value S3 represents a negative signal portion −1, so that, according to FIG. 4, it is assigned to the coefficient K134 in the interval I14. If one also assumes that the binary value A14 represents a zero value, then the binary word of the coefficient K134 is reduced by the binary number "1". Therefore, the coefficient G134 is smaller than the coefficient K134 by the binary number "1". However, in the case of the situation where the signal Amn is equal to a binary "1" and indicates that the difference Emn-Nmn is smaller than zero, then, according to the fifth column of Table II, the coefficient Kman is increased by the binary number "1". If one again proceeds therefrom that the ternary value S3 represents a negative signal portion −1, then the ternary value S3 is assigned to the coefficient K234 in the interval I24. If one further assumes that a negative difference Emn-Nmn is indicated by means of the binary value "1" for A24, then the coefficient K234 is increased by the binary number "1" and the coefficient G234 is formed.

The seventh and eighth lines of Table II refers to the two cases in which the ternary value Sa represents a positive signal portion +1. When, moreover, the binary value Amn is a binary "0", then, according to the fifth column of Table II, the binary number "1" is added to the coefficient Kman. For example, the ternary value S1 represents a positive signal portion +1 and is assigned to the coefficient K114 in the interval I14. When the binary value for Amn is "0", an addition of the binary number "1" to the coefficient Kman is required. In contrast thereto, in the case of the coefficient K214 which is assigned to the sub-interval I24, a substraction of the binary number "1" is required when the binary value A24 is "1". As the sixth column of Table II illustrates, the described corrections can also be undertaken with reversed operational signs.

The conditions illustrated in Table II can also be expressed by means of the following equation.

$$Gman = Kman + F[Ba(Va \not\equiv Amn) = Ba(\overline{Va} \not\equiv Amn)] \quad (1)$$

The two bracketed expressions on the right side of the equation (1) refer to non-equivalent linkages of two binary magnitudes which only supply a "1" value when the binary values of the two magnitudes are unequal. In the first bracketed expression, the two binary magnitudes to be linked are the values Va and Amn. In the second bracketed expression, the one binary magnitude is the complement of the value Va and the other binary magnitude is again the value Amn.

In this exemplary embodiment, the coefficient Kman is either not altered, or the binary number "1" is added, or the binary number "1" is subtracted. Basically, instead of the added or, respectively, subtracted binary number "1", a binary number could be added or, respectively, subtracted which represents a factor F. It is also conceivable, on a case-by-case basis, to add or, respectively, subtract different binary numbers as a function of other magnitudes, which, however, will not be discussed in detail in the framework of this discussion. The factor F can be a positive or a negative whole number.

With the assistance of the simulation correction stage NKOR illustrated in FIG. 1, the simulated signal Nmn is generated. This simulated signal is obtained, on the one hand, by means of summation of all coefficients Kman of a sub-interval which relates to positive signal portions +1 of the memory signals SSa, BBa, VVa and, on the other hand, by means of subtraction of all coefficients Kman of this sub-interval which refer to negative signal portions −1 of the these memory signals. The coefficients and memory signals of the sub-interval I14 are available in order to determine the simulated signal N14 according to FIG. 4. The ternary values S4 and S1 are positive signal portions +1, the ternary value S3 is a negative signal portion −1, and the ternary value S2 is a zero signal portion, as can be derived directly from FIG. 3. The memory signals BBa and VVa likewise indicate the same positive, negative and zero signal portions. For example, the two binary values B1 and V1 indicate the positive signal portion +1. The simulated signal N14 is obtained, on the one hand, by means of a summation of the coefficients K144 and K114 which relate to positive signal portions +1 and, on the other hand, by means of subtraction of the coefficients K134 which relate to the negative signal portion −1. The coefficient K124 which refers to a zero signal portion, is therefore not considered in the determination of the simulated signal N14. This condition is also expressed in a somewhat more general manner by means of the following equation.

$$Nmn = + \sum_{a=n-d+1}^{a=n} Kman \cdot Ba \cdot Va - \sum_{a=n-d+1}^{a=n} Kman \cdot Ba \cdot \overline{Va} \quad (2)$$

As the equation (2) illustrates, the magnitudes Ba and Va are multiplied with one another in the first expression on the right side of the equation. This is a binary multiplication which only produces a "1" value when both magnitudes Ba and Va respectively exhibit "1" values. This multiplication, therefore, only produces a "1" value when the ternary value +1 exists. The binary value Ba is multiplied with the complement of the binary value Va in the second expression on the right side of the equation (2). This multiplication only produces a "1" value when the ternary value −1 exists. Therefore, according to the first expression on the right side of the equation, all coefficients Kman are summed which relate to the positive ternary value +1 and, according to the second expression, all coefficients Kman are summed which relate to a negative ternary value −1. The index a indicates which coefficients and values are to be respectively summed. Accordingly, the lower limiting value of the index a is provided by means of the expression n−d+1. The number d relates to the plurality of the coefficients per sub-interval. With reference to the sub-interval I14, the lower limiting value a=1 is derived with n=4 and with d=4. Therefore, in the case of the sub-interval I14, the summations are to be undertaken over the magnitudes with the indices a=1 through a=4.

The same conditions are also derived from Table III below in which partial amounts of the simulation Nmn are listed for a specific index a. The combinations of the first two lines produce no partial amounts. In contrast, the combination "1", "0" for Ba and Va, respectively, produces a negative partial amount and the combination "1", "1" for Ba and Va, respectively, produces a positive partial amount.

TABLE III

| Ba | Va | Nmn Partial Amount for Special a |
|----|----|----------------------------------|
| 0  | 0  | 0                                |
| 0  | 1  | 0                                |
| 1  | 0  | −Kman                            |
| 1  | 1  | +Kman                            |

However, the simulated signal Nmn can also be determined according to equation (3) and according to Table IV below.

$$Nmn = - \sum_{a=n-d+1}^{a=n} Kman \cdot Ba \cdot Va + \sum_{a=n-d+1}^{a=n} Kman \cdot \overline{Ba \cdot Va} \quad (3)$$

TABLE IV

| Ba | Va | Nmn Partial Amount for Special a |
|----|----|----------------------------------|
| 0  | 0  | 0                                |
| 0  | 1  | 0                                |
| 1  | 0  | +Kman                            |
| 1  | 1  | −Kman                            |

In FIG. 3, the abscissa refers to time, so that a strictly temporal assignment is given between the individual signals and intervals. This strictly temporal assignment is also valid for FIG. 4 for the signals Sn, Bn and Vn and for the sub-intervals Imn. However, for the purpose of a more simple illustration, a deviation has been taken from a strictly temporal assignment in favor of a casual assignment in the description of the exemplary embodiment with respect to the remaining magnitudes illustrated in FIG. 4. The casual assignments are directly readable from the magnitudes arranged below one another.

However, the temporal assignments can also be explained on the basis of FIG. 4. When, for example, the coefficients K144, K134, K124, K114 and when all ternary values S1, S2, S3 and S4 are all simultaneously available in the sub-interval I14, then the simulated signal N14, the signal A14 and the coefficients G144, G134, G124, G114 can be determined practically simultaneously during the time of the sub-interval I14 so that, in this case, not only a casual assignment, but, rather, also a strictly temporal assignment is illustrated by means of FIG. 4.

When the coefficients K144, K134, K124, K114 and the ternary values S1, S2, S3 and S4 of the memory signal SSa are not available simultaneously, but rather in a temporal succession in the sub-interval I14, then, for example, the simulated signal N14 can be determined at its earliest at the point in time at which the last coefficient of the sub-interval and the last ternary value of the sub-interval are available. Even given such a serial processing of the individual magnitudes, therefore, it is conceivable that the simulated signal N14 is still formed in the sub-interval I14. As a function of the processing speed, however, cases are also conceivable in which the simulated signal N14 is only determined at a later point in time, for example, in the interval I24, I34 or I15. In a similar manner, the signals M14, E14, A14 and the coefficients G144, G134, G124 and G114 can be determined at later points in time. Independently of the more or less delay generation of the individual magnitudes, however, the casual assignment illustrated in FIG. 4 remains and it is of absolutely no importance when the individual magnitudes are determined with delays which are negligible with respect to the total simulation duration. The total duration of the intervals I1–I4 has been assumed as the total simulation duration in this exemplary embodiment.

The comparator KOMP illustrated in FIG. 1 can operate either digitally or analog. First, a comparator KOMP operating on an analog basis is assumed. The received signal is an analog signal so that a signal Emn can be directly employed for the comparison. In contrast, the simulation correction stage KNOR emits a digital signal which is converted into a corresponding analog signal with the assistance of a digital/analog converter so that two analog signals are available to the comparator. The digital/analog converter is to be considered as a part of the comparator KOMP. Given these assumptions, an analog signal Mmn is emitted from the output of the comparator and is advantageously fed to an analog operating receiver EM.

In the case where the comparator KOMP operates on a digital basis, the analog received signal must be converted into a digital received signal with the assistance of an analog/digital converter. This analog/digital converter can be assumed as being a part of the comparator KOMP. Since a digital signal is emitted at the output of the simulation correction stage NKOR, the digital signal can be directly employed for the comparison in the comparator KOMP. Given these assumptions, the comparator emits a digital signal Mmn and it is advantageous to provide a digitally operating receiver EM.

Figure 5:
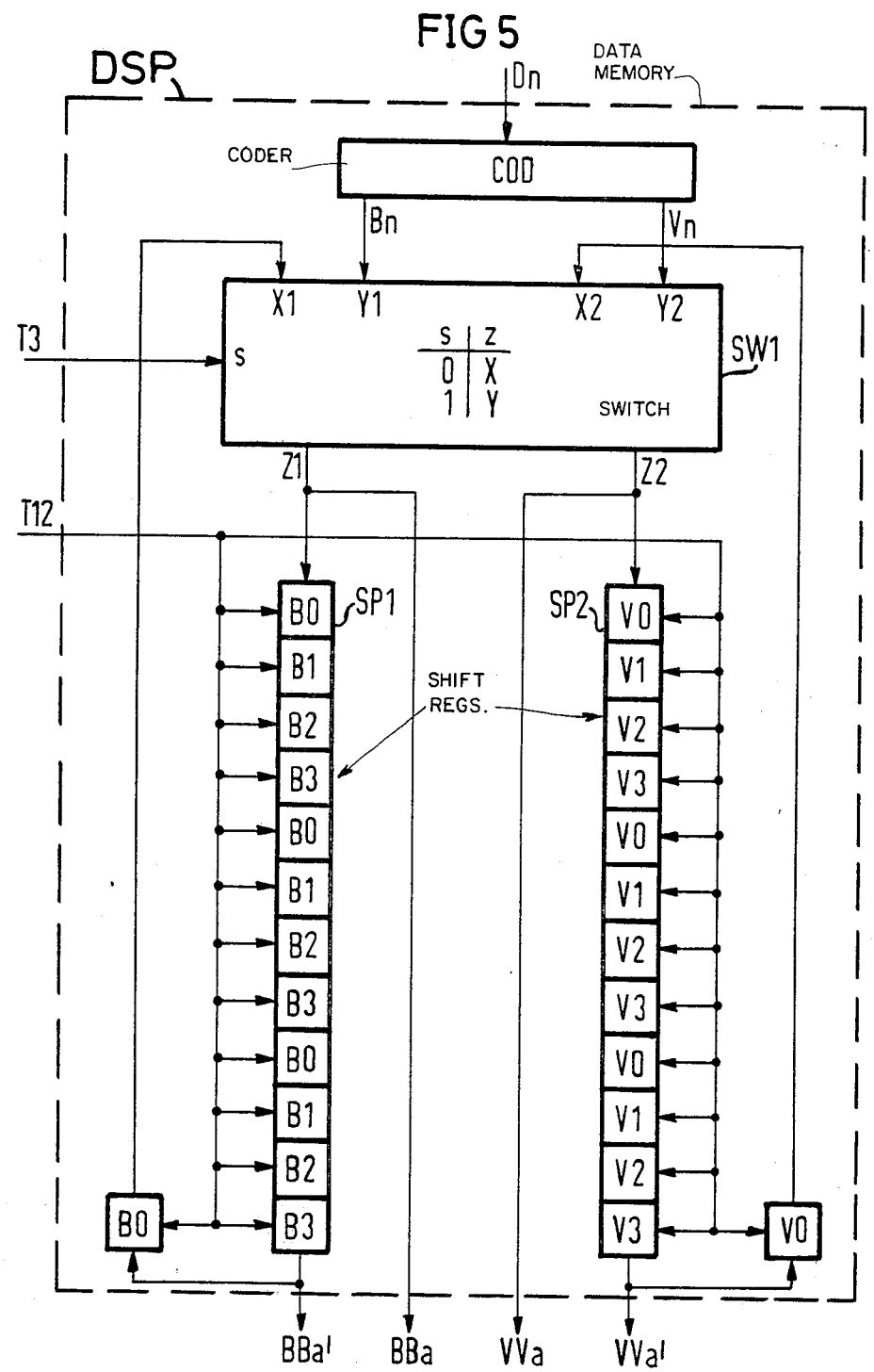
FIG. 5 is an exemplary embodiment of a data memory required in the area of the two stations of FIGS. 1 and 2.

FIG. 5 illustrates an exemplary embodiment of a data memory DSP which was schematically illustrated in FIG. 1. The memory DSP essentially comprises a coder COD, a switch SW1 and two storage units SP1, SP2. The coder COD receives the data signal Dn illustrated in FIG. 3 at its input and emits the signals Bn and Vn, likewise illustrated in FIG. 3, by way of its two outputs.

The switch SW1 is driven by the clock TG with the clock pulse T3 illustrated in FIG. 3. The clock pulse T3 is supplied to a control input s and the switch SW1 is constructed to operate in accordance with the truth table shown thereon. Given s=0, x1 is connected with z1 and x2 is connected with z2, while given s=1, y1 is connected with z1 and y2 is connected with z2.

The storage units SP1 and SP2 are designed essentially as shift registers and are operated by the clock TG with the clock pulse T12. The storage unit SP1 has a total of 13 storage cells which are referenced with the reference symbols of their momentary storage contents. It was therefore assumed that the amounts B0, B1, B2 and B3 are repeatedly stored in the storage unit SP1. In accordance with FIG. 4, the plurality of the sub-intervals was referenced with the reference symbol c and the plurality of the coefficients per sub-interval was referenced with the index d. In a more general manner of expression, the storage unit SP1 comprises a shift register having a total of c·d storage cells and of an additional storage cell B0, which serves as an intermediate store and connects the outputs of the shift register with the input x1 of the switch SW1.

The storage unit SP2 serves for storing the operational sign and comprises a shift register having a total of c·d storage cells and of an additional storage cell V0 which is connected as an intermediate store between the output of the shift register and the input x2 of the switch SW1. The storage cells of the storage unit SP2 are referenced with the reference symbols of the momentarily stored operational signs V0, V1, V2, V3.

With respect to the seizure of the storage units SP1 and SP2, precisely at that point in time at which the oldest amount V0 and the oldest operational sign V0 are lost is illustrated. Because it is assumed that, at the point in time illustrated, the amount B0 is applied at the input x1 of the switch SW1, but is not relayed to the output z1. However, in place of the amount V0, the amount V4 is newly transferred by way of the input y1 and the output z1 into the storage unit SP1. Since the amounts B3, B2, B1 are again shifted into the storage unit SP1 by way of the input x1 and by way of the output z1 with the next clock pulse T12, a storage occupation with the amounts B4, B3, B2, B1 occurs after the illustrated time point. In a similar manner, it is assumed in the case of the operational sign V0 that it is not relayed by way of the input x2 of the switch SW2 to the output z2 and that the operational sign V4 is newly shifted into the storage unit SP2 by way of the input y2 and by way of the output z2. Therefore, after the next clock pulse T12 of the clock TG, the operational signs V4, V3, V2 and V1 are stored in the storage unit SP2. The signal BBa' which is identical with the signal BBa, but delayed in time, is emitted from the output of the shift register of the storage unit SP1, the shift register having twelve storage cells. In a similar manner, a signal VVa' is emitted at the output of the shift register of the storage unit SP2, the signal VVa' being identical with the signal VVa, but likewise delayed in time.

The coefficient memory KSP, the coefficient correction stage KKOR and the simulation correction stage KNOR are schematically illustrated in FIG. 1 and are shown in greater detail in FIG. 6.

In each storage block of the coefficient memory KSP c·d coefficients are stored. For the purpose of a more simple illustration, it has been assumed, with p=5, that each storage block is formed of only five storage cells and that the individual coefficients are respectively formed of five-place binary numbers. In this exemplary embodiment, the coefficients K144, K134, K124 . . . K324, K314 are stored from the bottom toward the top. These are the same coefficients which are also assigned in FIG. 4 to the interval I4. With the assistance of the clock pulse T12, the coefficient memory KSP is addressed and operated in the manner of a shift register so that the coefficients are output in succession.

The coefficient correction stage KKOR is formed of a memory SP3, an EXCLUSIVE OR gate EX1, an inverter IN, two AND gates and two adders AD1 and AD2. The memory SP3 serves as an intermediate memory for delaying the signal Amn in the clock pulse of the clock pulse signal T3 illustrated in FIG. 3. The delayed signal Amn is supplied to an input of the EXCLUSIVE OR gate EX1. The output of the gate EX1 is connected to one of the two AND gates by way of the inverter IN. On the other hand, the adder AD1 receives a five-place binary number which represents the coefficients Kman, when, on the other hand, a "1" signal is supplied to the adder AD1 from the AND gate, the adder AD1 adds the number "1" to the coefficient. When a "0" signal is supplied to the adder AD1 by way of the output of the AND gate, then the coefficient is not changed and the adder AD1 emits a binary number which is identical to the coefficient by way of its outputs.

On the one hand, the adder AD2 receives the binary number emitted by the adder AD1, and, on the other hand, the adder AD2 receives the output signal of the corresponding AND gate. If a "1" signal is emitted by way of this AND gate, then the adder AD2 subtracts the number "1" from the binary number supplied at the input. If a "0" signal is supplied to the adder AD2 by way of the gate, then the binary number emitted by way of the outputs of the adder AD2 is identical to that binary number which is supplied by way of the inputs. In this manner, the corrected coefficients Gman are emitted by way of the outputs of the adder AD2 and are supplied to the inputs of the coefficient memory KSP.

TABLE V

| ZL | a | Wa' | BBa' | AD1 | AD2 |
|----|---|-----|------|-----|-----|
| 10 | 0 | 0 | 0 | | |
| 11 | 1 | 0 | 0 | Kman + 0 | Kman − 0 |
| 12 | 0 | 1 | 0 | | |
| 13 | 1 | 1 | 0 | | |
| 14 | 0 | 0 | 1 | Kman + 1 | Kman − 0 |
| 15 | 1 | 0 | 1 | Kman + 0 | Kman − 1 |
| 16 | 0 | 1 | 1 | Kman + 0 | Kman − 1 |
| 17 | 1 | 1 | 1 | Kman + 1 | Kman − 0 |

The manner of operation of the two adders AD1 and AD2 can be seen from Table V. The first column of Table V characterizes the lines ZL 10-17. The second column refers to the signal a which is supplied to an input of the EXCLUSIVE OR gate EX1. The third column refers to the signal VVa' which is supplied to a second input of the EXCLUSIVE OR gate. The fourth column refers to the amounts BBa' which are to be taken into consideration. The fifth or, respectively, sixth column refers to the adders AD1 or, respectively, AD2. In lines 10, 11, 12, 13, the signal BBa' is "0" indicating that the coefficients emitted at the same time are not involved in the summation for providing the simulated signal Nmn. For this reason, the coefficient Kman is not changed in the cases of the lines 10-13. Therefore, the coefficient is not changed, even though the simulated signal Nmn is too large in the case of lines 10 and 13 and the simulated signal Nmn is too small in the case of lines 11 and 12.

In the case of the lines 14 and 17, the simulated signals Nmn are too small, for which reason a number "1" is added to the coefficient in the adder AD1. In the cases of the lines 15 and 16, the simulated signal Nmn is too large, for which reason the number "1" is subtracted from the coefficient in the adder AD2. Therefore, in the cases of the lines 14-17, these corrections are carried out because the signal BBa' is "1" and indicates that the concerned coefficients Kman are involved in the summation formation of the simulated signal Nmn.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method for full duplex two-wire transmission of a ternary data signal whose ternary values are formed of positive signal portions, negative signal portions and zero signal portions, in which disruptions of a received signal at a station by the transmission signal of the station are prevented with the assistance of a simulated signal, comprising the steps of:

assigning c·d coefficients each having p bits to each ternary value of the ternary data signal, where c signifies a predetermined plurality of sub-intervals of the ternary value interval, d signifies a predetermined plurality of coefficients per sub-interval, and p signifies a predetermined plurality of bits;

storing information concerning the sequence of the transmitted ternary values and providing storage signals during each sub-interval to indicate the last d ternary values, and respectively assigned d coefficients;

forming a simulated signal from the coefficients of a sub-interval;

comparing the values of the received signal occurring during the sub-intervals with the simultaneously occurring values of the simulated signal to provide a first or second binary comparison value indicating whether the concerned value of the received signal is less than or greater than the value of the simulated signal; and correcting the coefficients and reassigning the corrected coefficients to the ternary values of a ternary data signal while disregarding change of the coefficients in response to zero signal portions of the ternary values of the storage signals, by increasing the coefficients by a predetermined number in response to negative signal portions of the ternary values of the storage signals and in response to said first binary comparison value, increasing the coefficients by a predetermined number in response to positive signal portions of the ternary values of the storage signals and in response to said second binary comparison value, decreasing the coefficients by a predetermined number in response to negative signal portions of the ternary values of the storage signals and in response to said second binary comparison value, and decreasing the coefficients by a predetermined number in response to positive signal portions of the ternary values of the storage signals and in response to said first binary comparison value.

2. The method of claim 1, wherein the step of forming the simulated signal is further defined as:

summing all coefficients of a sub-interval which refer to positive signal portions and subtracting all coefficients of the sub-interval relating to negative signal portions.

3. The method of claim 1, wherein the step of forming the simulated signal is further defined as:

subtracting all coefficients of a sub-interval which relate to positive signal portions of a storage signal and summing all coefficients of the sub-interval which relate to negative signal portions.

4. The method of claim 1, comprising the further step of:

producing two binary signals from the ternary data signal, a first of said binary signals indicating the values of the ternary data signal and the second binary signal indicating the operational sign of the ternary data signal.

5. The method of claim 4, wherein the first and second binary signals each have d binary values, and comprising the step of:

storing t times the d binary values of the first binary signal and the d binary values of the second binary signal during a ternary value interval.

6. A method for full duplex two-wire transmission of a ternary data signal whose ternary values are formed of positive signal portions, negative signal portions and zero signal portions, in which disruptions of a received signal at a station by the transmission signal of the station are prevented with the assistance of a simulated signal, comprising the steps of:

assigning c·d coefficients each having p bits to each ternary value of the ternary data signal, where c signifies a predetermined plurality of sub-intervals of the ternary value interval, d signifies a predetermined plurality of coefficients per sub-interval, and p signifies a predetermined plurality of bits;

storing information concerning the sequence of the transmitted ternary values and providing storage signals during each sub-interval to indicate the last d ternary values, and respectively assigned d coefficients;

forming a simulated signal from the coefficients of a sub-interval;

comparing the values of the received signal occurring during the sub-intervals with the simultaneously occurring values of the simulated signal to provide a first or second binary comparison value indicating whether the concerned value of the received signal is less than or greater than the value of the simulated signal; and correcting the coefficients and reassigning the corrected coefficients to the ternary values of a ternary data signal while disregarding change of the coefficients in response to zero signal portions of the ternary values of the storage signals, by decreasing the coefficients by a predetermined number in response to negative signal portions of the ternary values of the storage signals and in response to said first binary comparison value, decreasing the coefficients by a predetermined number in response to positive signal portions of the ternary values of the storage signals and in response to said second binary comparison value, increasing the coefficients by a predetermined number in response to negative signal portions of the ternary values of the storage signals and in response to said second binary comparison value, and increasing the coefficients by a predetermined number in response to positive signal portions of the ternary values of the storage signals and in response to said first binary comparison value.

7. In a full duplex two-wire transmission system which has a transmitting-receiving station connected to a two-wire line, and which includes a data source connected to a transmitter, and a receiver, and in which the data source provides ternary data signals whose ternary values are formed of positive signal portions, negative signal portions and zero signal portions, and in which a signal simulator is connected to the data source to provide a simulated signal by assigning c·d coefficients, each having p bits, to each ternary value of a ternary data signal, where c signifies a predetermined plurality of sub-intervals of the ternary value interval, d signifies a predetermined plurality of coefficients per sub-interval, and p signifies a predetermined plurality of bits, and in which information concerning the sequence of the transmitted ternary values are stored and storage signals indicating the last d ternary values and assigned to respectively d coefficients are emitted during each sub-interval, and in which the simulated signal is obtained by algebraic addition of al coefficients of a sub-interval relating to positive signal portions and by algebraic addition of all coefficients of the sub-interval which relate to negative signal portions, the improvement therein comprising:

a data memory connected to the data source and including first shift registers for storing the ternary values; and a coefficient memory for receiving and storing the coefficients.

* * * * *